Dec. 19, 1967  J. L. YONKERS  3,358,536
METHOD AND APPARATUS FOR CUTTING TUBING
Filed Oct. 20, 1965  3 Sheets-Sheet 1

INVENTOR.
JOHN L. YONKERS
BY
ATTORNEYS

Dec. 19, 1967 J. L. YONKERS 3,358,536
METHOD AND APPARATUS FOR CUTTING TUBING
Filed Oct. 20, 1965 3 Sheets-Sheet 2

INVENTOR.
JOHN L. YONKERS
BY
Mason, Kolehmainen, Rathburn and Wyss
ATTORNEYS

Dec. 19, 1967   J. L. YONKERS   3,358,536
METHOD AND APPARATUS FOR CUTTING TUBING
Filed Oct. 20, 1965   3 Sheets-Sheet 3

INVENTOR.
JOHN L. YONKERS
BY
Mason, Kolehmainen,
Rathburn and Wyss
ATTORNEYS

United States Patent Office 3,358,536
Patented Dec. 19, 1967

3,358,536
METHOD AND APPARATUS FOR CUTTING
TUBING
John L. Yonkers, 2030 Sunset Ridge Road,
Northbrook, Ill. 60062
Filed Oct. 20, 1965, Ser. No. 498,619
7 Claims. (Cl. 83—54)

ABSTRACT OF THE DISCLOSURE

An improved method and apparatus is provided for cutting short lengths of tubing from a stock supply. Elastic drive members are provided for advancing the tubing against a stop independently of the advancing tubing. A reciprocating cutter shears the tubing. Energy stored in the elastic drive during the dwell periods of the tubing is sufficient to advance the tubing against the stop before the subsequent cutting stroke of the reciprocating cutter.

The present invention relates to a method and apparatus for cutting tubing, and more particularly, to a method and apparatus for cutting short lengths of tubing from a stock supply of plastic or like tubing.

It is frequently desirable to cut short lengths of tubing from a stock supply of considerable length. One such application is in the manufacture of solderless connectors of the type used for telephone circuits and the like and which are encased in an outer jacket of insulation. Although tubing of such insulation material may readily be cut by conventional methods, manufacturing quantities may be in the many millions of pieces per week. Consequently it is necessary to rapidly and economically cut such jacket tubing at high speed and with a minimum cost.

Accordingly one object of the present invention is to provide a new and improved apparatus and method for cutting short lengths of tubing from a stock supply of tubing.

Another object of the present invention is to provide a new and improved apparatus and method for rapidly and economically cutting tubing of plastic or similar material.

Further objects and advantages of the present invention will become apparent as the following description proceeds and the features of novelty which characterize the invention will be pointed out with particularity in the claims annexed to and forming a part of this specification.

In accordance with these and many other objects of the present invention there is provided an apparatus for cutting short lengths of tubing from a stock supply of tubing wherein the stock supply of tubing is driven through a die opening in a shear plate and against an axial stop. A reciprocating cutter then moves against the opening in the shear plate to sever the tubing. At the same time the tubing is prevented from advancing so long as the reciprocating cutter blocks the opening in the shear plate. Once the reciprocating cutter is retracted to open the die opening in the shear plate, then the tubing will advance until it once again strikes against the stop. In order to rapidly drive the tubing against the stop, it has been found that the tubing may be quickly and rapidly advanced by driving the apparatus through an elastic drive member so that energy is stored in the elastic member during the dwell periods of the tubing, and after retraction of the cutter, the stored energy in the elastic member combines with the energy of the driving motor to rapidly advance the tubing.

The present invention is also directed to the method of cutting short lengths of tubing from the stock supply of tubing and including the steps of positioning a section of tubing against a stop, then simultaneously cutting the tubing ahead of the stop while holding the uncut portion. During the dwell period of the tubing, energy is elastically stored from the prime mover, and upon release of the uncut tubing, the tubing is rapidly advanced under the combined force of the stored energy and the prime mover.

For a better understanding of the present invention reference may be had to the accompanying drawings wherein.

Figure 1:
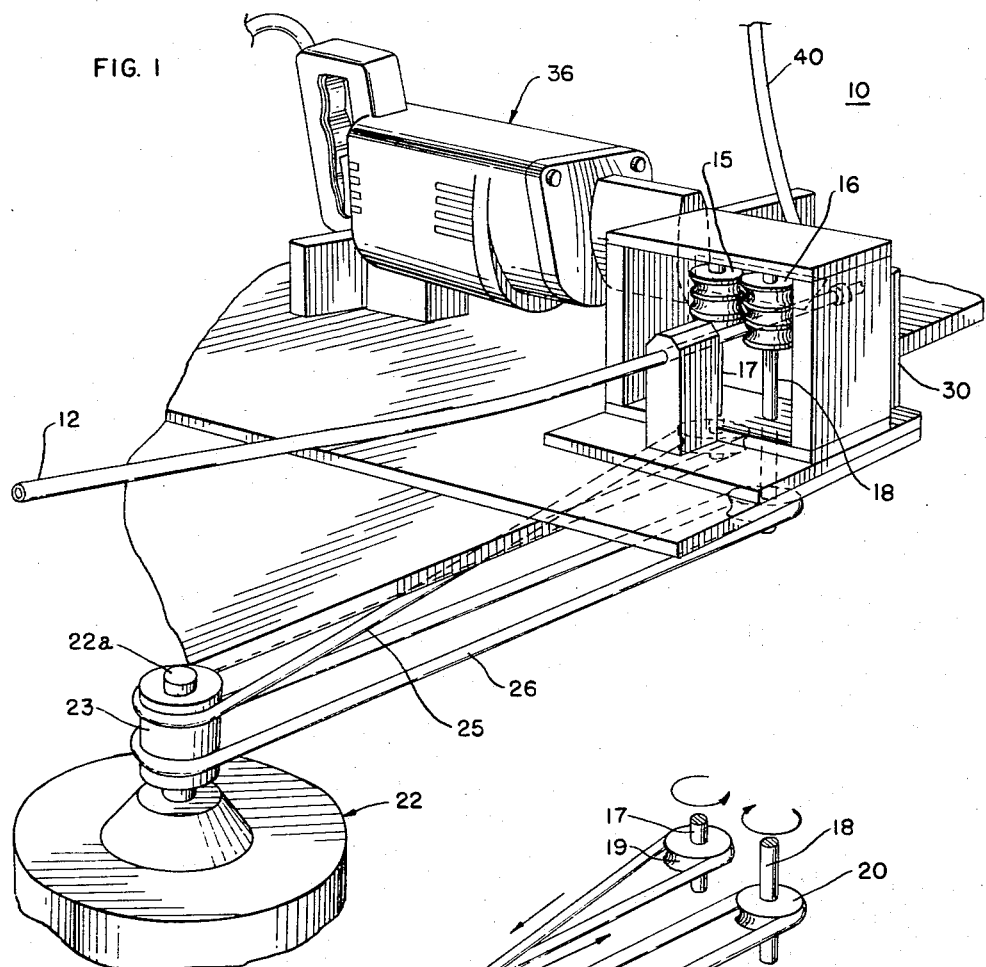
FIG. 1 is a perspective view of a tube cutting apparatus according to the present invention.
Figure 2:
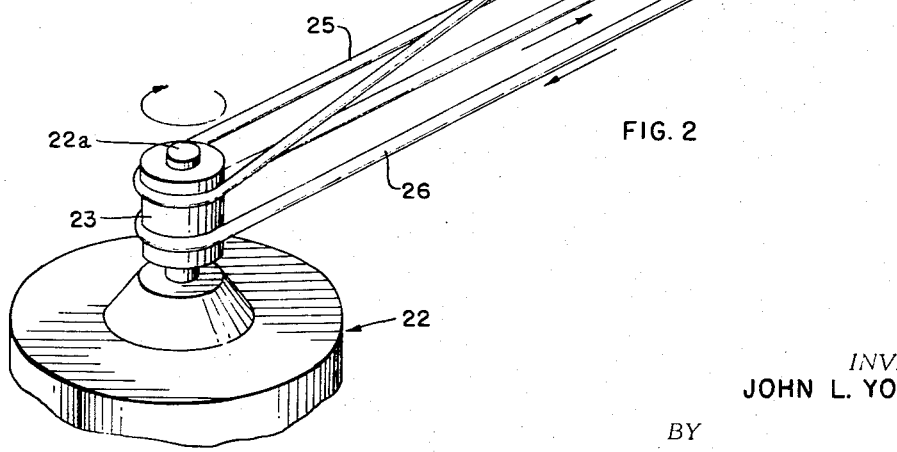
FIG. 2 is a perspective view more clearly illustrating the drive assembly of the tube cutting apparatus of FIG. 1.
Figure 3:
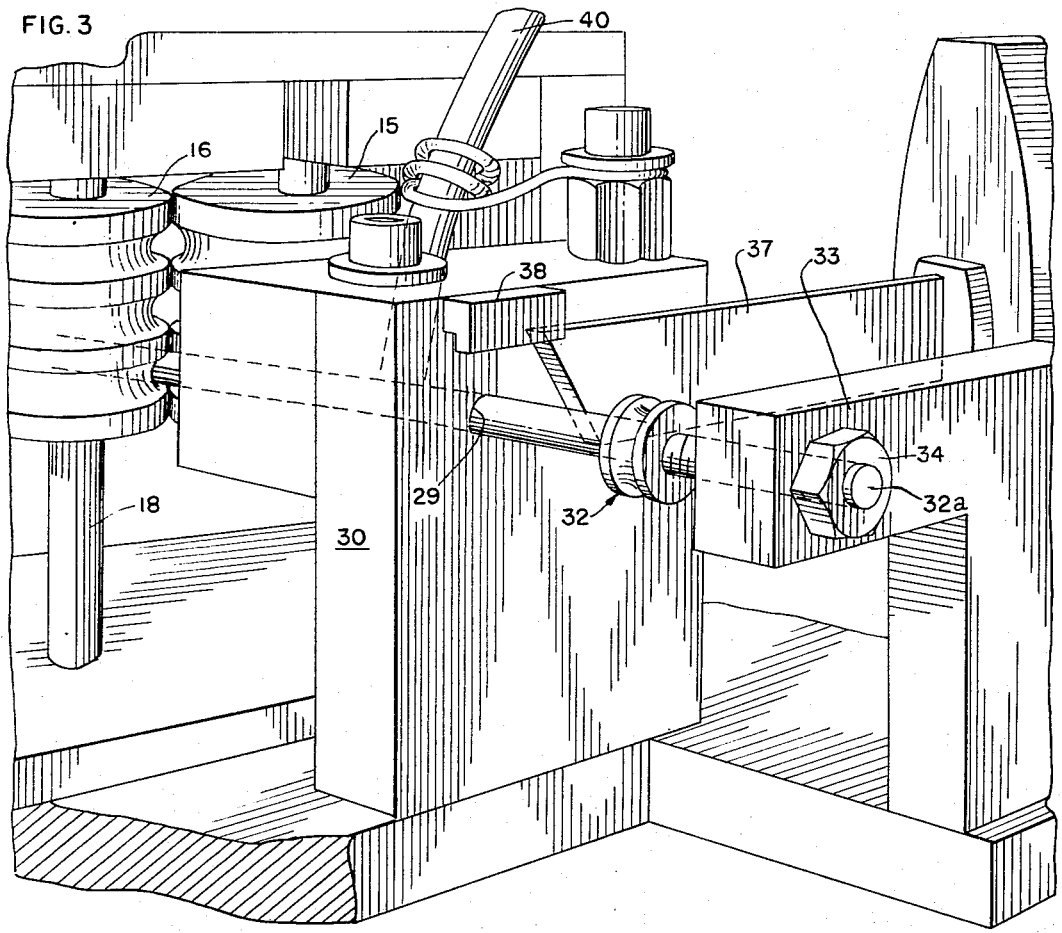
FIGS. 3 and 4 are perspective views of the tube cutting apparatus more clearly illustrating the action of the cutter in severing and holding the uncut tubing.
Figure 4:
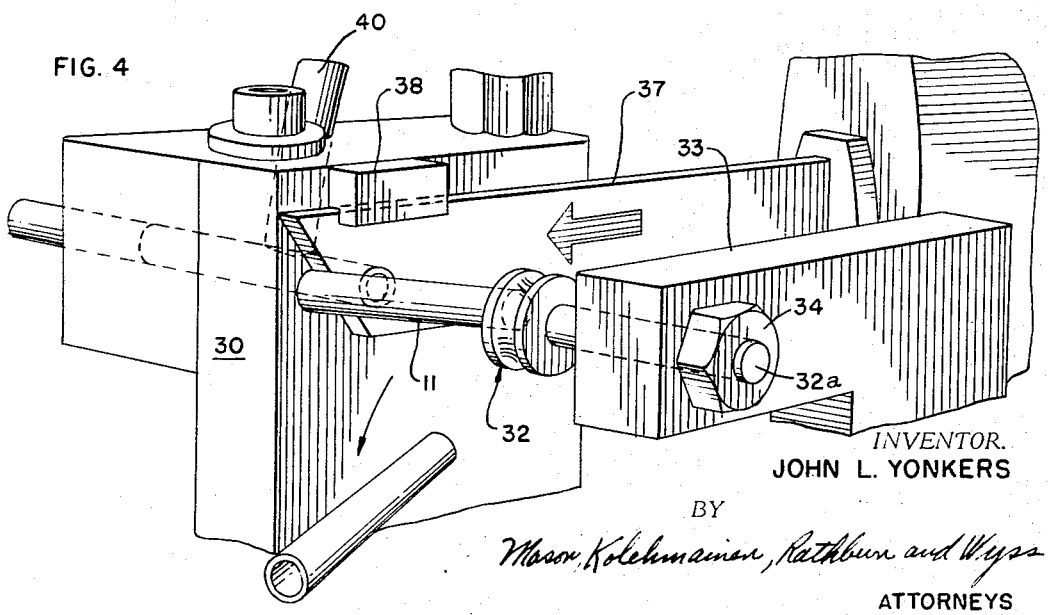
Figure 5:
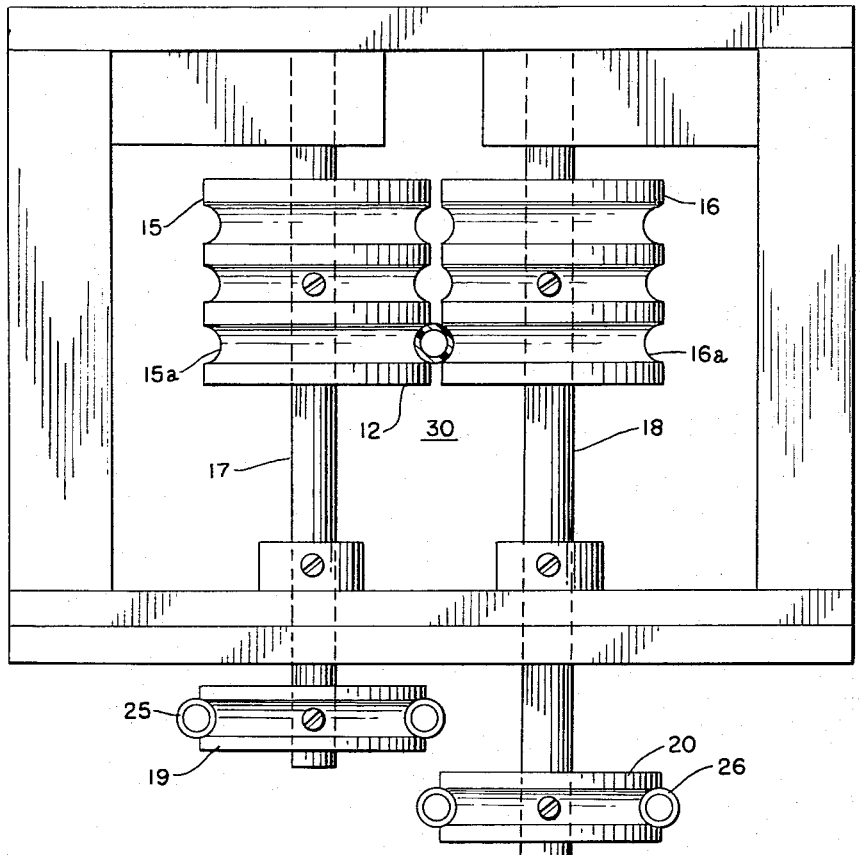
FIG. 5 is a cross sectional view of the tube cutting apparatus illustrating the drive rollers of the tube cutting apparatus.
Figure 6:
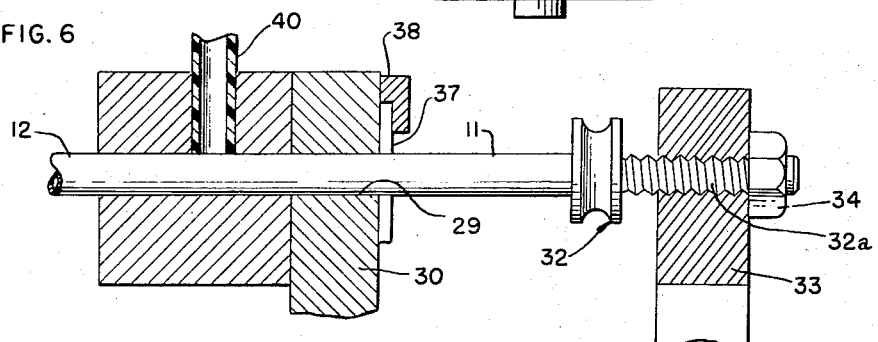
FIGS. 6 and 7 are fragmentary sectional views of the tube cutting apparatus illustrating a liquid coolant and lubricant system.
Figure 7:
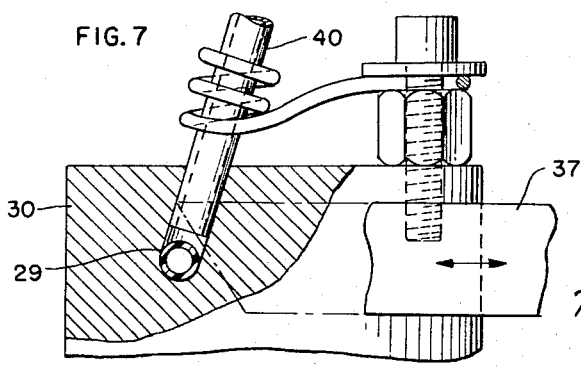

Referring now to the drawings, there is illustrated an improved tube cutting apparatus in FIG. 1, shown generally at 10, and adapted to cut short lengths of tubing 11, FIGS. 3 and 4, from a stock supply 12 which may be in the form of a rod or coil. The tubing may be of any readily shearable material such as heat shrinkable polyolefin insulation, For driving the tubing 12 through the tube cutting apparatus 10, there is provided a pair of spaced parallel drive rollers 15 and 16 each secure to a respective roller shaft 17 and 18. Drive pulleys 19 and 20 are fastened to the roller shafts 17 and 18 respectively. Each of the drive rollers 15, 16 is provided with one or more somewhat semicircular circumferential grooves 15a, 16a, FIG. 5, for gripping against the outer surface of the tubing 12. In the illustrated embodiment, multiple grooves are provided in each of the pulleys 15a and 16a to permit changing from one set of grooves to another set of grooves as the grooves wear, thus providing, in the instant case, the single set of drive rollers 15, 16 having three times the life as compared to a similar drive roller having a single groove.

In order to drive the drive rollers 15 and 16, there is provided a suitable prime mover, here fragmentarily illustrated as an electric motor 22 carrying a double groove belt pulley 23 on its shaft 22a. Suitable elastic belts 25 and 26 connect the belt pulley 23 with the respective drive pulleys 19 and 20. The elastic belts 25 and 26 may be formed of any elastic material, for example, wound spring belts. It will be noticed that one of the belts illustrated as belt 25, is crossed in order that the drive rollers 15 and 16 turn at opposite angular directions thereby driving the tubing 12 in the same direction.

To provide for accurately positioning the tubing 12, the tubing 12 passes from the drive rollers 15 and 16 through a die opening 29 in a shear plate 30 and axially abuts against an adjustable stop 32 having a shank 32a threaded into a stationary frame portion 33 of the tube cutting apparatus. A nut 34 forms a lock for the stop 32.

To provide for severing of the tubing 12 at the die opening 29, there is provided a conventional reciprocating saw 36, FIG. 1. The saw 36 includes a saw or shear cutter blade 37 reciprocally movable along the outer surface of the shear plate 30 across the die opening 29. An angle shaped guide 38 on the outer surface of the shear plate 30 guides the shear blade 37 against the shear plate 30.

To provide cooling and lubrication to the tube cutting apparatus, there is provided a cooling tube 40 connected to a supply of water or other lubricant or coolant, and directed through an opening in the frame of the tube cutting apparatus 10 to drop on the tube 12. Such droplets of coolant or lubricant are subsequently effective to lubricate and cool the die opening 29 and shear blade 37.

From the above description of the invention, its operation is believed clear. However, briefly, it will be understood that the apparatus and method of the tube cutting apparatus 10 provides a rapid and economical means of cutting short lengths 11 of tubing from a stock supply 12 of tubing by first positioning the end of the tubing against the stop 32. Thereafter the reciprocation of the shear blade 37 is effective first to sever the tubing 12 and simultaneously to cover the die opening 29 and prevent the uncut portion of tubing 12 from advancing during the cutting stroke, as best illustrated in FIG. 4. During such dwell period of the tubing 12, energy from the electric motor 22 is stored in the elastic belts 25 and 26. Excess energy of the motor 12 can be dissipated by slippage between the pulley 23, belts 25 and 26, and drive pulleys 19 and 20; and in addition by slippage between the supply tube 12 and the drive rollers 15 and 16. Although a slight overdrive of the motor is desirable, excess overdrive of the motor 22 may be minimized by providing a direct current motor with a speed controller or otherwise regulating the speed of the motor 22 to permit the required advance of the tube 12 for each stroke of the shear blade 37. Once the shear blade 37 has retracted to uncover the die opening 29, the energy stored in the elastic belts 25 and 26, combined with the energy transmitted by the motor 22, will be effective to rapidly project the tube 12 to advance another section thereof against the stop 32. The subsequent stroke of the shear blade is effective to sever a second length of short tubing. In this manner each stroke of the reciprocating saw 36 is effective to cut one length of tubing.

Although the present invention has been described by reference to only a single embodiment thereof, it will be apparent that numerous other modifications and embodiments may be devised by those skilled in the art, for example, the present invention may be used to cut suitable rod, wire, or the like. It is therefore intended by the appended claims to cover all such modifications and embodiments as will fall within the true spirit and scope of the present invention.

What is claimed as new and desired to be secured by Letters Patent of the United States is:

1. An apparatus for cutting short lengths of material from a stock supply of material comprising a pair of parallel, spaced drive rollers for receiving and feeding a stock supply of material, a shear plate having a die opening for receiving said stock supply of material, a stop axially aligned with said opening to limit the travel of material driven through said opening, a reciprocal cutter positioned for movement across said opening, means for driving said cutter, prime mover means independent of the last mentioned means for driving said drive rollers and including a drive pulley, and at least one elastic belt member connected to drive one of said drive rollers.

2. An apparatus as set forth in claim 1 above wherein said stop is adjustable.

3. An apparatus as set forth in claim 1 above wherein said cutter means comprises a reciprocating saw.

4. An apparatus as set forth in claim 1 wherein there is provided a second elastic belt member connected to drive the other of said drive rollers in the opposite direction to said one roller.

5. An apparatus for cutting short lengths of tubing from a stock supply of tubing comprising tube driving means for feeding a stock supply of tubing, a tubing stop positioned to limit the travel of said tubing, cutter means independent of said tube driving means between said tube driving means and said tubing stop for cutting said tubing, prime mover means for said tube driving means, and elastic means drivingly interconnecting said prime mover means and said tube driving means.

6. A method of cutting short lengths of tubing from a stock supply of tubing comprising the steps of continuously biasing a section of tubing toward a stop; simultaneously cutting the tubing ahead of the stop and blocking the advance of the uncut portion, and elastically storing energy from a prime mover for propelling said tubing; and releasing the uncut tubing to permit rapid advancing of the uncut tubing against the stop before the subsequent stroke of the cutter under the combined force of the stored energy and the prime mover independently of the cutting thereof.

7. A method of cutting short lengths of tubing from a stock supply of tubing comprising the steps of continuously biasing a section of tubing toward a stop; driving a blade across the tubing ahead of the stop to simultaneously cut the tubing and block the advance of the uncut portion; elastically storing energy from a prime mover for propelling said tubing; and retracting the blade to release the uncut tubing to permit rapid advancing of the uncut tubing against the stop before the subsequent cutting stroke of the blade under the combined force of the stored energy and the prime mover independently of the cutting thereof.

References Cited

UNITED STATES PATENTS

| | | | |
|---|---|---|---|
| 300,758 | 6/1884 | Brazelle | 83—269 X |
| 1,549,266 | 8/1925 | Kendig | 83—262 X |
| 2,005,589 | 6/1935 | McCoy. | |
| 2,898,995 | 8/1959 | Funnell | 83—262 X |
| 3,167,986 | 2/1965 | Jacobs | 83—262 X |
| 3,220,291 | 11/1965 | Olsen, et al. | 83—268 X |

JAMES M. MEISTER, *Primary Examiner.*